United States Patent Office 2,759,933
Patented Aug. 21, 1956

2,759,933

DERIVATIVES OF ARALKYLBENZOIC ACID

Merrill Eugene Speeter, Kalamazoo, Mich., assignor to Bristol Laboratories Inc., Syracuse, N. Y., a corporation of New York No Drawing. Application February 18, 1953,
Serial No. 337,653

5 Claims. (Cl. 260—247.2)

This invention relates to a new class of organic compounds and to methods for the preparation thereof. More particularly, this invention relates to a series of basically substituted amides of ortho-benzylbenzoic acid.

The new compounds of the present invention are the free bases, the acid addition salts and the quaternary salts of the bases which may be represented by the following general formula:

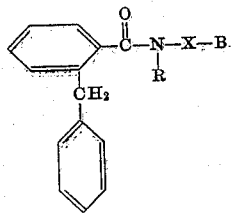

wherein X represents straight and branched chain, bivalent alkylene radicals containing from two to six carbon atoms inclusive; B represents a member selected from the group consisting of piperidino, morpholino, pyrrolidino, (lower)alkylpyrrolidino, N'-alkylpiperazino, pipecolino and di(lower)alkylamino; and R represents a member selected from the group consisting of hydrogen and lower alkyl.

The compounds of this invention possess useful activity as anti-spasmodic and analgesic agents. The free bases and acid addition salts are useful as intermediates in the preparation of the quaternary salts; the quaternary salts are useful as germicides and disinfectants.

The compounds of this invention may be prepared by treating ortho-benzylbenzoyl chloride with an appropriate tertiary-amino-substituted aliphatic primary or secondary amine and recovering the substituted amide.

The following examples will serve to illustrate the invention without limiting it thereto. All temperatures are centigrade.

EXAMPLE I

*N-(beta-morpholinylethyl)-ortho-benzylbenzamide*

A mixture of 42.5 grams (0.2 mole) of ortho-benzylbenzoic acid with 48 grams (i. e., excess) thionyl chloride is warmed for one hour on the steam bath. The excess thionyl chloride is removed by distillation under reduced pressure. The remaining heavy oil is dissolved in 30 ml. of benzene and the benzene is removed by distillation under reduced pressure. The residue, free of thionyl chloride, is dissolved in sufficient benzene to give two hundred ml. of solution.

One hundred ml. of this benzene solution containing approximately 0.1 mole of ortho-benzylbenzoyl chloride, is added to 26 grams (0.2 mole) of β-morpholinylethylamine in 400 ml. of benzene. The mixture is warmed on the steam bath for two hours and poured on ice. The mixture is made strongly basic with ammonium hydroxide and the benzene layer is separated and extracted with dilute hydrochloric acid. On neutralization of the acid extracts with ammonium hydroxide, an oil separates which crystallizes on cooling. The crystals of N-(beta-morpholinylethyl)-ortho-benzylbenzamide are recrystallized first from isopropyl alcohol and then from cyclohexane and is found to melt at about 114°–115° C.

*Analysis.*—Calculated for $C_{20}H_{24}N_2O_2$:

|   | Calculated | Found |
|---|---|---|
| C | 74.04 | 73.82 |
| H | 7.45 | 7.26 |

A solution of the amide in 500 ml. of dry ether is saturated with hydrogen chloride. The salt melts at about 173°–175° after recrystallization from isopropyl alcohol and drying at 100° C. in vacuo. Undried crystals tend to melt at 145°–146°, then to resolidify after loss of solvent of crystallization to a solid of M. P. 173°–175°.

*Analysis.*—Calculated for $C_{20}H_{24}N_2O_2 \cdot HCl$:

|   | Calculated | Found |
|---|---|---|
| C | 66.57 | 66.36 |
| H | 6.98 | 6.97 |

Ten grams of methyl iodide is added to a solution of ten grams of the amide in 150 ml. of isopropyl alcohol. The mixture is placed in a pressure bottle, warmed thirty minutes on the steam bath, cooled and allowed to stand for eighteen hours. Crystals of N-(beta-morpholinylethyl)-ortho-benzylbenzamide methiodide separate, are collected by filtration, and found to melt at about 139°–140° C. after recrystallization from isopropyl alcohol.

*Analysis.*—Calculated for $C_{21}H_{27}N_2O_2I$:

|   | Calculated | Found |
|---|---|---|
| C | 54.07 | 54.10 |
| H | 5.83 | 5.88 |

EXAMPLE II

*N-methyl-N-dimethylaminoethyl ortho-benzylbenzamide*

To one hundred ml. of a benzene solution containing about 0.1 mole of ortho-benzylbenzoylchloride and prepared as in Example I, there is added 0.2 mole of N-methyl-beta-(dimethylamino)ethylamine in 400 ml. of benzene. The mixture is warmed on the steam bath for two hours and poured on ice. The mixture is made basic with ammonium hydroxide and the benzene layer is separated and extracted with dilute hydrochloric acid. On neutralization of the acid extracts with ammonium hydroxide, oily N-methyl-N-dimethylaminoethyl ortho-benzylbenzamide separates and may be recovered by decantation and purified by distillation in high vacuum. This free base is converted into quaternary and acid addition salts by the method of Example I using ethyl iodide and hydrogen bromide respectively.

The invention also includes the non-toxic organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. The method of preparation of these salts is made apparent in the examples above.

This invention also contemplates the quaternary salts of the free bases of the general formula above, which may be prepared as made apparent in the examples above by treatment of the free bases with quaternary salt-forming substances. These quaternary salt-forming substances include methyl chloride, methyl bromide, methyl iodide, ethyl chloride, ethyl bromide, ethyl iodide, n- propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromade, n-amobromide, n-hexochloride, benzochloride, benzobromide, methosulfate, ethosulfate, methobenzenesulfonate, metho-p-toluenesulfonate, etc.

The acid chloride of ortho-benzylbenzoic acid is reacted according to the procedure of Example I with equimolar amounts of 5-(di-n-propylamino)-1-aminopentane, 5-(di-n-propylamino)-1-methylaminopentane, beta-(diethylamino)isopropylamine, N - ethyl - beta - (diethylamino)-isopropylamine, beta-1-alpha-pipecolylethylamine, N-n-propyl-beta-(1-alpha-pipecolyl)-ethylamine, 3-(1-gamma-pipecolyl)-1-aminopropane, 3 - (1 - gamma-pipecolyl)-1-isopropylaminopropane, beta - 1 - pyrrolidylethylamine, N-n-butyl-beta - 1 - pyrrolidylethylamine, beta-dimethylamino-n-butylamine, N-n-amyl-beta-dimethylamino - n - butylamine, 3-(ethylmethylamino) - 1 - aminopropane, 3-(ethylmethylamino)-1-n-hexylaminopropane, beta - dipropylaminoethylamine, N-isohexyl - beta - dipropylaminoethylamine, 6 - (dimethylamino)-1-aminohexane, beta-piperidylethylamine, and 1 - (4-methyl - piperazyl)-4-aminobutane respectively to produce N - 5 - di - n - propylamino - 1 - pentylortho - benzylbenzamide, N-methyl-N-5-di-n-propylamino - 1 - pentyl-ortho-benzylbenzamide, N-beta-(diethylamino)isopropyl-ortho-benzylbenzamide, N-ethyl - N - beta-(diethylamino)isopropyl-ortho-benzylbenzamide, N-beta - (1 - alpha - pipecolyl)-ethyl - ortho - benzylbenzamide, N - n - propyl-N-beta-(1-alpha-pipecolyl)ethyl-ortho-benzylbenzamide, N-gamma-(1-gamma-pipecolyl)-propyl-ortho-benzylbenzamide, N-isopropyl - N - gamma-(1-gamma-pipecolyl) - propyl-ortho-benzylbenzamide, beta - (1 - pyrrolidyl)ethyl - ortho - benzylbenzamide, N - n - butyl - N - beta - (1-pyrrolidyl)ethyl - ortho - benzylbenzamide, N - beta - (dimethylamino) - n - butyl - ortho - benzylbenzamide, N - n - amyl - N - beta - (dimethylamino) - n - butyl - ortho-benzylbenzamide, N-gamma-(ethyl-methylamino)-n-propyl-ortho-benzylbenzamide, N-n-hexyl - N - gamma-(ethylmethylamino)-n-propyl-ortho-benzylbenzamide, N - beta - (dipropylamino)ethyl-ortho-benzylbenzamide, N-isohexyl - N - beta - (dipropylamino)-ethyl-ortho-benzyl-benzamide, N-6-(dimethylamino)-n-hexyl-ortho - benzyl-benzamide, N-beta-piperidylethyl-ortho-benzylbenzamide, and N-4-(4'-methylpiperazyl)-n-butyl-ortho-benzylbenzamide, respectively.

In general, the salts are soluble in water and constitute a preferred form of the invention. The organic bases, on the other hand, are generally water-insoluble, but soluble in simple organic solvents such as alcohols, ethers, hydrocarbons, and lower ketones.

I claim:

1. A member selected from the group consisting of compounds having the structure

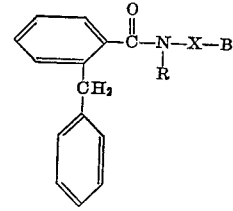

wherein X represents a bivalent alkylene radical containing from two to six carbon atoms inclusive, B represents a member selected from the group consisting of piperidino, morpholino, pyrrolidino, N'-alkylpiperazino, pipecolino and di(lower)alkylamino and R represents a member selected from the group consisting of hydrogen and lower alkyl; and acid addition salts and quaternary salts of said compounds.

2. A member selected from the group consisting of N-(beta-morpholinylethyl)-ortho-benzylbenzamide and non-toxic acid addition and quaternary salts thereof.

3. A member selected from the group consisting of N-methyl-N-dimethylaminoethyl-ortho - benzylbenzamide and non-toxic acid addition and quaternary salts thereof.

4. A member selected from the group consisting of N-n-propyl - N - beta-(1-alpha-pipecolyl)ethyl-ortho-benzyl-benzamide and non-toxic acid addition and quaternary salts thereof.

5. The process of reacting ortho-benzylbenzoyl chlorides with tertiary-amino-substituted aliphatic primary and secondary amines and recovering a compound having the structure

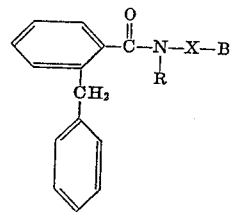

wherein X represents straight and branched chain, bivalent alkylene radicals containing from two to six carbon atoms inclusive, B represents a member selected from the group consisting of piperidino, morpholino, pyrrolidino, N'-alkylpiperazino, pipecolino and di(lower)alkylamino and R represents a member selected from the group consisting of hydrogen and lower alkyl.

References Cited in the file of this patent

UNITED STATES PATENTS

| | | |
|---|---|---|
| 2,009,144 | Miescher et al. | July 23, 1935 |
| 2,629,736 | Krimmel | Feb. 24, 1953 |
| 2,629,737 | Krimmel | Feb. 24, 1953 |
| 2,634,274 | Krimmel | Apr. 7, 1953 |